UNITED STATES PATENT OFFICE.

A. TAW, OF PHILADELPHIA, PENNSYLVANIA.

IMPROVED COMPOSITION FOR TREATING LEATHER.

Specification forming part of Letters Patent No. 44,025, dated August 30, 1864.

*To all whom it may concern:*

Be it known that I, A. TAW, of Philadelphia, in the county of Philadelphia and State of Pennsylvania, have invented a new and Improved Composition for Treating Leather; and I do hereby declare that the following is a full, clear, and exact description thereof, which will enable any person skilled in the art to make and use the same.

This invention consists in a composition of the product obtained by the distillation of a mixture of the residuum of petroleum or coal-tar and tallow with animal fat—such as tallow, horse-fat, neat's-foot oil, and fish-oil—to which a small percentage of beeswax is added. The proportions in which I mix these ingredients together are about as follows:

| | Parts. |
|---|---|
| Tallow | 40 |
| Horse-fat | 7½ |
| Beeswax | 2½ |
| Neat's-foot oil | 10 |
| Product of distillation of the residuum of petroleum or coal-tar mixed with from five to twenty per cent. of tallow | 30 |
| Fish-oil | 10 |
| | 100 |

The residuum of petroleum is generally considered of very little or no value, and by subjecting this residuum, mixed with more or less tallow, to distillation I obtain a product which, when properly mixed with animal fat, produces a superior "dubbing."

In preparing my composition I first melt the tallow, horse-fat, and beeswax (if such is used) in a kettle, and in another kettle I place the product of distillation of the residuum of petroleum or coal-tar mixed with tallow. When limpid I mix it with the melted fats, and the oils, which have been previously mixed together, are added, and the whole is well stirred together while hot. After the mixture is cold it is ready for use, and it is applied to the leather in the usual manner. It forms a cheap and very effective substitute for the ordinary dubbing, and by increasing the percentage of the product of redistillation of the residuum of petroleum or coal-tar and tallow the mixture is rendered applicable for curriers' use.

I am aware that petroleum residuum has before been employed in the manufacture of dubbing.

What I claim as new, and desire to secure by Letters Patent, is—

A composition made by mixing tallow, horse-fat, neat's-foot oil, fish-oil, and beeswax with the product obtained by the distillation of a mixture of animal fat and the residuum of petroleum or coal-tar, in the manner and in about the proportions herein specified.

ABRAHAM TAW.

Witnesses:
JOHN DAINTY,
JOSEPH BROBSTON.